US012317259B2

(12) United States Patent
Takeda et al.

(10) Patent No.: US 12,317,259 B2
(45) Date of Patent: May 27, 2025

(54) TRANSMISSION OF DOWNLINK FEEDBACK INFORMATION WITH DOWNLINK CONTROL INFORMATION FOR MULTI-CELL SCHEDULING

(71) Applicant: QUALCOMM Incorporated, San Diego, CA (US)

(72) Inventors: Kazuki Takeda, Tokyo (JP); Jing Sun, San Diego, CA (US); Huilin Xu, Temecula, CA (US); Wanshi Chen, San Diego, CA (US); Peter Gaal, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 513 days.

(21) Appl. No.: 17/660,174

(22) Filed: Apr. 21, 2022

(65) Prior Publication Data
US 2023/0345478 A1    Oct. 26, 2023

(51) Int. Cl.
*H04W 72/1273*    (2023.01)
*H04L 1/00*    (2006.01)
(Continued)

(52) U.S. Cl.
CPC ....... *H04W 72/1273* (2013.01); *H04L 1/0061* (2013.01); *H04L 1/08* (2013.01);
(Continued)

(58) Field of Classification Search
CPC ......... H04W 72/1273; H04W 72/0453; H04W 72/23; H04W 76/30; H04W 72/12;
(Continued)

(56) References Cited

U.S. PATENT DOCUMENTS

2022/0264341 A1\*  8/2022  Liu ................. H04W 72/23
2022/0295484 A1\*  9/2022  Yi .................. H04W 72/0446
(Continued)

FOREIGN PATENT DOCUMENTS

WO    WO-2022047348 A2    3/2022
WO    WO-2022066599 A1    3/2022

OTHER PUBLICATIONS

3GPP TS 38.213: "3rd Generation Partnership Project, Technical Specification Group Radio Access Network, NR, Physical layer procedures for control (Release 16)", 3GPP TS 38.213, V16.8.0, 3rd Generation Partnership Project, Mobile Competence Centre, 650, Route Des Lucioles, F-06921 Sophia-Antipolis Cedex, France, Dec. 2021, 189 Pages, XP052118407, Section 10.1, p. 114.
(Continued)

*Primary Examiner* — Abdullahi Ahmed
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive downlink control information (DCI) associated with a DCI format for shared channel scheduling on a set of cells, wherein the DCI is associated with a cell radio network temporary identifier (C-RNTI) and a configured scheduling radio network temporary identifier (CS-RNTI). The UE may decode the DCI to identify a scheduling on the set of cells or to identify downlink feedback information (DFI) based at least in part on a determination of whether the C-RNTI or the CS-RNTI satisfies a cyclic redundancy check (CRC). Numerous other aspects are described.

30 Claims, 14 Drawing Sheets

(51) Int. Cl.
*H04L 1/08* (2006.01)
*H04L 1/1607* (2023.01)
*H04L 1/1812* (2023.01)
*H04L 5/00* (2006.01)
*H04W 72/0453* (2023.01)
*H04W 72/23* (2023.01)
*H04W 76/30* (2018.01)

(52) U.S. Cl.
CPC .......... *H04L 1/1614* (2013.01); *H04L 1/1812* (2013.01); *H04L 5/0053* (2013.01); *H04W 72/0453* (2013.01); *H04W 72/23* (2023.01); *H04W 76/30* (2018.02)

(58) Field of Classification Search
CPC ...... H04W 72/232; H04L 1/0061; H04L 1/08; H04L 1/1614; H04L 1/1812; H04L 5/0053; H04L 5/001
See application file for complete search history.

(56) References Cited

U.S. PATENT DOCUMENTS

| | | | |
|---|---|---|---|
| 2023/0038082 A1* | 2/2023 | Khoshnevisan | H04B 7/088 |
| 2023/0039103 A1* | 2/2023 | Khoshnevisan | H04W 52/325 |
| 2023/0101753 A1* | 3/2023 | Khoshnevisan | H04L 5/0094 370/329 |
| 2023/0139269 A1* | 5/2023 | MolavianJazi | H04W 72/23 370/329 |
| 2023/0199797 A1* | 6/2023 | Yi | H04W 72/232 370/329 |
| 2023/0217456 A1* | 7/2023 | Yi | H04L 5/0094 370/329 |

OTHER PUBLICATIONS

International Search Report and Written Opinion—PCT/US2023/016095—ISA/EPO—Jul. 11, 2023.

* cited by examiner

| CIF | Dynamic PDSCH/PUSCH scheduling | SPS/CG activation/release/re-tx |
|---|---|---|
| 0 | Self (CC#0) | Self (CC#0) |
| 1 | CC#1 | CC#1 |
| 2 | CC#2, CC#3 | CC#5 |
| 3 | CC#4, CC#5, CC#6 | |

650

| CIF | Dynamic PDSCH/PUSCH scheduling | SPS/CG activation/release/re-tx |
|---|---|---|
| 0 | Self (CC#0) | Self (CC#0) |
| 1 | CC#1 | CC#1 |
| 2 | CC#2, CC#3 | CC#2, CC#3 |
| 3 | CC#4, CC#5, CC#6 | CC#4, CC#5, CC#6 |

652

| CIF | Dynamic PDSCH/PUSCH scheduling | SPS/CG activation/release/re-tx |
|---|---|---|
| 0 | Self (CC#0) | Self (CC#0) |
| 1 | CC#1 | CC#1 |
| 2 | CC#2, CC#3 | CC#4 |
| 3 | CC#4, CC#5, CC#6 | CC#6 |

654

| CIF | Dynamic PDSCH/PUSCH scheduling | SPS/CG activation/release/re-tx |
|---|---|---|
| 0 | Self (CC#0) | Self (CC#0) |
| 1 | CC#1 | CC#1 |
| 2 | CC#2, CC#3 | CC#2, CC#3 |
| 3 | CC#4, CC#5, CC#6 | CC#5, CC#6 |

660

| CIF | Dynamic PDSCH/PUSCH scheduling | SPS/CG activation/release/re-tx |
|---|---|---|
| 0 | Self (CC#0) | Self (CC#0) |
| 1 | CC#1 | CC#1 |
| 2 | CC#2, CC#3 | CC#1, CC#5, CC#6 |
| 3 | CC#4, CC#5, CC#6 | CC#3 |

662

| CIF | Dynamic PDSCH/PUSCH scheduling | CG-DFI |
|---|---|---|
| 0 | Self (CC#0) | Self (CC#0) |
| 1 | CC#1 | CC#1 |
| 2 | CC#2, CC#3 | CC#2 |
| 3 | CC#4, CC#5, CC#6 | CC#4 |

670

| CIF | Dynamic PDSCH/PUSCH scheduling | CG-DFI |
|---|---|---|
| 0 | Self (CC#0) | Self (CC#0) |
| 1 | CC#1 | CC#1 |
| 2 | CC#2, CC#3 | CC#5 |
| 3 | CC#4, CC#5, CC#6 | CC#2 |

672

| CIF | Dynamic PDSCH/PUSCH scheduling | CG-DFI |
|---|---|---|
| 0 | Self (CC#0) | Self (CC#0) |
| 1 | CC#1 | CC#1 |
| 2 | CC#2, CC#3 | CC#2, CC#3 |
| 3 | CC#4, CC#5, CC#6 | CC#4, CC#5 |

674

FIG. 6D

TRANSMISSION OF DOWNLINK FEEDBACK INFORMATION WITH DOWNLINK CONTROL INFORMATION FOR MULTI-CELL SCHEDULING

FIELD OF THE DISCLOSURE

Aspects of the present disclosure generally relate to wireless communication and to techniques and apparatuses for transmission of downlink feedback information with downlink control information for multi-cell scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving downlink control information (DCI) associated with a DCI format for shared channel scheduling on a set of cells, wherein the DCI is associated with a cell radio network temporary identifier (C-RNTI) and a configured scheduling radio network temporary identifier (CS-RNTI). The method may include decoding the DCI to identify a scheduling on the set of cells or to identify downlink feedback information (DFI) based at least in part on a determination of whether the C-RNTI or the CS-RNTI satisfies a cyclic redundancy check (CRC).

Some aspects described herein relate to a method of wireless communication performed by a network entity. The method may include transmitting, to a UE, DCI associated with a DCI format for shared channel scheduling on a set of cells, wherein the DCI is associated with a C-RNTI and a CS-RNTI. The method may include communicating with the UE based at least in part on a scheduling on the set of cells or DFI decoded from the DCI based at least in part on a whether the C-RNTI or the CS-RNTI satisfies a CRC.

Some aspects described herein relate to a UE for wireless communication. The user equipment may include a memory and one or more processors coupled to the memory. The one or more processors may be configured to receive DCI associated with a DCI format for shared channel scheduling on a set of cells, wherein the DCI is associated with a C-RNTI and a CS-RNTI. The one or more processors may be configured to decode the DCI to identify a scheduling on the set of cells or to identify DFI based at least in part on a determination of whether the C-RNTI or the CS-RNTI satisfies a CRC.

Some aspects described herein relate to a network entity for wireless communication. The network entity may include a memory and one or more processors coupled to the memory. The one or more processors may be configured to transmit, to a UE, DCI associated with a DCI format for shared channel scheduling on a set of cells, wherein the DCI is associated with a C-RNTI and a CS-RNTI. The one or more processors may be configured to communicate with the UE based at least in part on a scheduling on the set of cells or DFI decoded from the DCI based at least in part on a whether the C-RNTI or the CS-RNTI satisfies a CRC.

Some aspects described herein relate to a non-transitory computer-readable medium that stores a set of instructions for wireless communication by a UE. The set of instructions, when executed by one or more processors of the UE, may cause the UE to receive DCI associated with a DCI format for shared channel scheduling on a set of cells, wherein the DCI is associated with a C-RNTI and a CS-RNTI. The set of instructions, when executed by one or more processors of the UE, may cause the UE to decode the DCI to identify a scheduling on the set of cells or to identify DFI based at least in part on a determination of whether the C-RNTI or the CS-RNTI satisfies a CRC.

Some aspects described herein relate to a non-transitory computer-readable medium that stores a set of instructions for wireless communication by a network entity. The set of instructions, when executed by one or more processors of the network entity, may cause the network entity to transmit, to a UE, DCI associated with a DCI format for shared channel scheduling on a set of cells, wherein the DCI is associated with a C-RNTI and a CS-RNTI. The set of instructions, when executed by one or more processors of the network entity, may cause the network entity to communicate with the UE based at least in part on a scheduling on the set of cells or DFI decoded from the DCI based at least in part on a whether the C-RNTI or the CS-RNTI satisfies a CRC.

Some aspects described herein relate to an apparatus for wireless communication. The apparatus may include means for receiving DCI associated with a DCI format for shared channel scheduling on a set of cells, wherein the DCI is associated with a C-RNTI and a CS-RNTI. The apparatus may include means for decoding the DCI to identify a scheduling on the set of cells or to identify DFI based at least in part on a determination of whether the C-RNTI or the CS-RNTI satisfies a CRC.

Some aspects described herein relate to an apparatus for wireless communication. The apparatus may include means for transmitting, to a UE, DCI associated with a DCI format for shared channel scheduling on a set of cells, wherein the DCI is associated with a C-RNTI and a CS-RNTI. The apparatus may include means for communicating with the UE based at least in part on a scheduling on the set of cells or DFI decoded from the DCI based at least in part on a whether the C-RNTI or the CS-RNTI satisfies a CRC.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A-6E are diagrams illustrating examples associated with transmission of downlink feedback information (DFI) with DCI for multi-cell scheduling, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
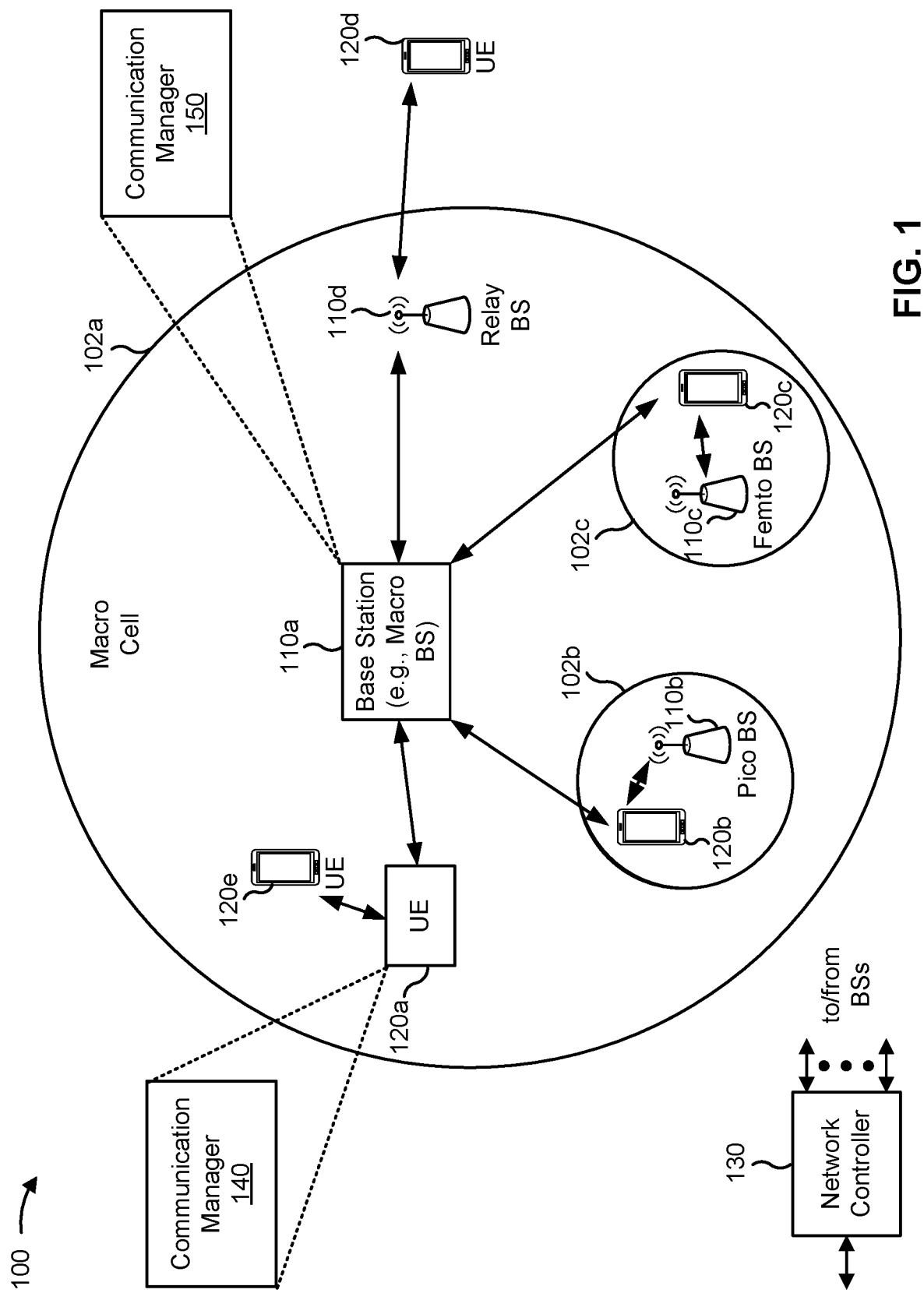
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive downlink control information (DCI) associated with a DCI format for shared channel scheduling on a set of cells, wherein the DCI is associated with a cell radio network temporary identifier (C-RNTI) and a configured scheduling radio network temporary identifier (CS-RNTI); and decode the DCI to identify a scheduling on the set of cells or to identify downlink feedback information (DFI) based at least in part on a determination of whether the C-RNTI or the CS-RNTI satisfies a cyclic redundancy check (CRC). Additionally, or alternatively, the communication manager 140 may perform one or more other operations described herein.

In some aspects, a network entity (e.g., the base station 110) may include a communication manager 150. As described in more detail elsewhere herein, the communication manager 150 may transmit, to a UE, DCI associated with a DCI format for shared channel scheduling on a set of cells, wherein the DCI is associated with a C-RNTI and a CS-RNTI; and communicate with the UE based at least in part on a scheduling on the set of cells or DFI decoded from the DCI based at least in part on a whether the C-RNTI or the CS-RNTI satisfies a CRC. Additionally, or alternatively, the communication manager 150 may perform one or more other operations described herein.

As indicated above, FIG. 1 is provided as an example. Other examples may differ from what is described with regard to FIG. 1.

Figure 2:
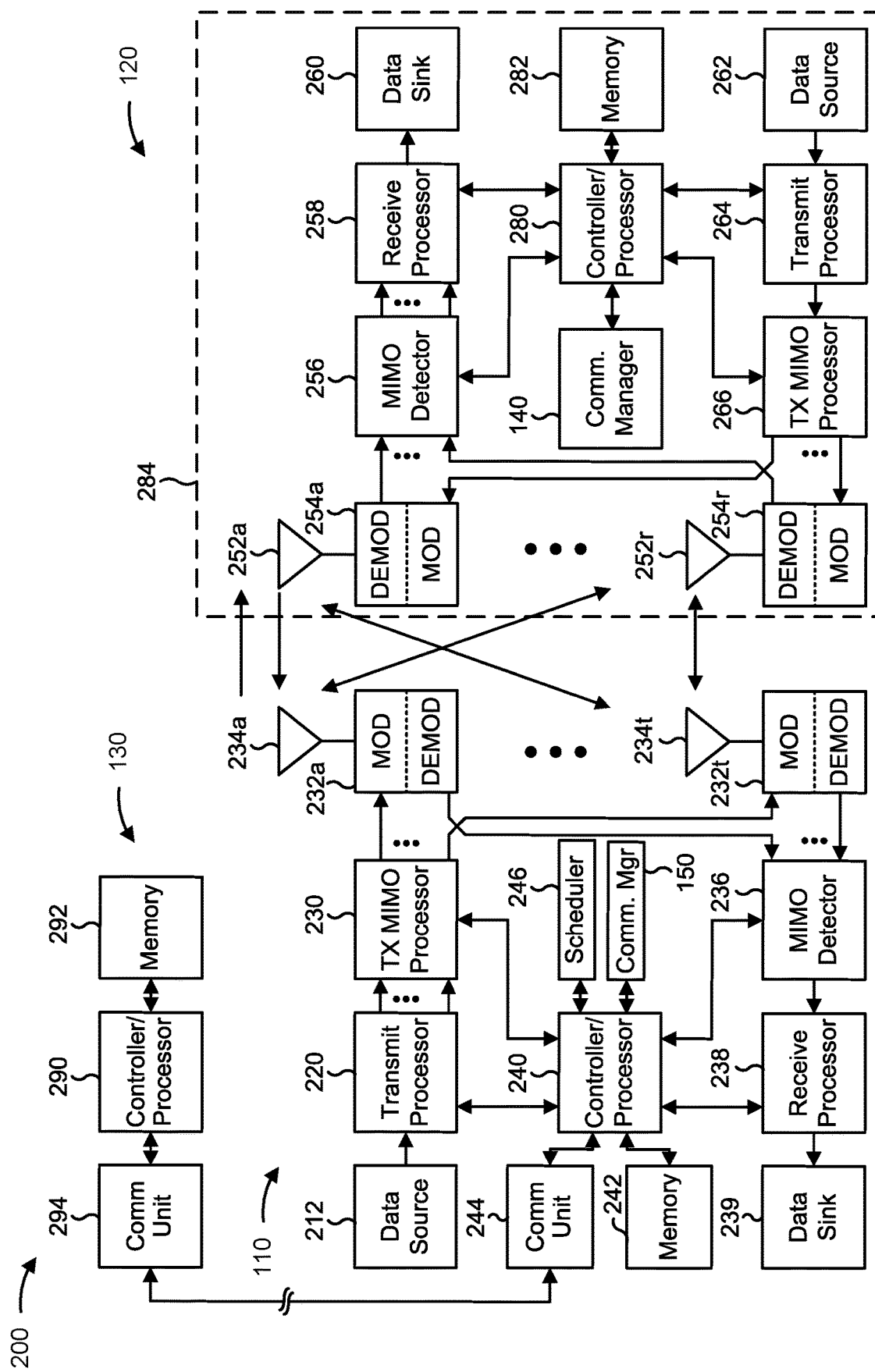
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6A-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A-10).

The controller/processor 240 of the base station 110, the controller/processor 280 of the UE 120, and/or any other component(s) of FIG. 2 may perform one or more techniques associated with transmission of DFI with DCI for multi-cell scheduling, as described in more detail elsewhere herein. In some aspects, the network entity described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving (e.g., using antenna 252, modem 254, MIMO detector 256, receive processor 258, controller/processor 280, memory 282, or the like) DCI associated with a DCI format for shared channel scheduling on a set of cells, wherein the DCI is associated with a C-RNTI and a CS-RNTI; and/or means for decoding (e.g., using antenna 252, modem 254, MIMO detector 256, receive processor 258, controller/processor 280, memory 282, or the like) the DCI to identify a scheduling on the set of cells or to identify DFI based at least in part on a determination of whether the C-RNTI or the CS-RNTI satisfies a CRC. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., the base station 110) includes means for transmitting (e.g., using controller/processor 240, transmit processor 220, TX MIMO processor 230, modem 232, antenna 234, memory 242, or the like), to a UE, DCI associated with a DCI format for shared channel scheduling on a set of cells, wherein the DCI is associated with a C-RNTI and a CS-RNTI; and/or means for communicating (e.g., using controller/processor 240, transmit processor 220, TX MIMO processor 230, modem 232, antenna 234, memory 242, MIMO detector 236, receive processor 238, or the like) with the UE based at least in part on a scheduling on the set of cells or DFI decoded from the DCI based at least in part on a whether the C-RNTI or the CS-RNTI satisfies a CRC. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
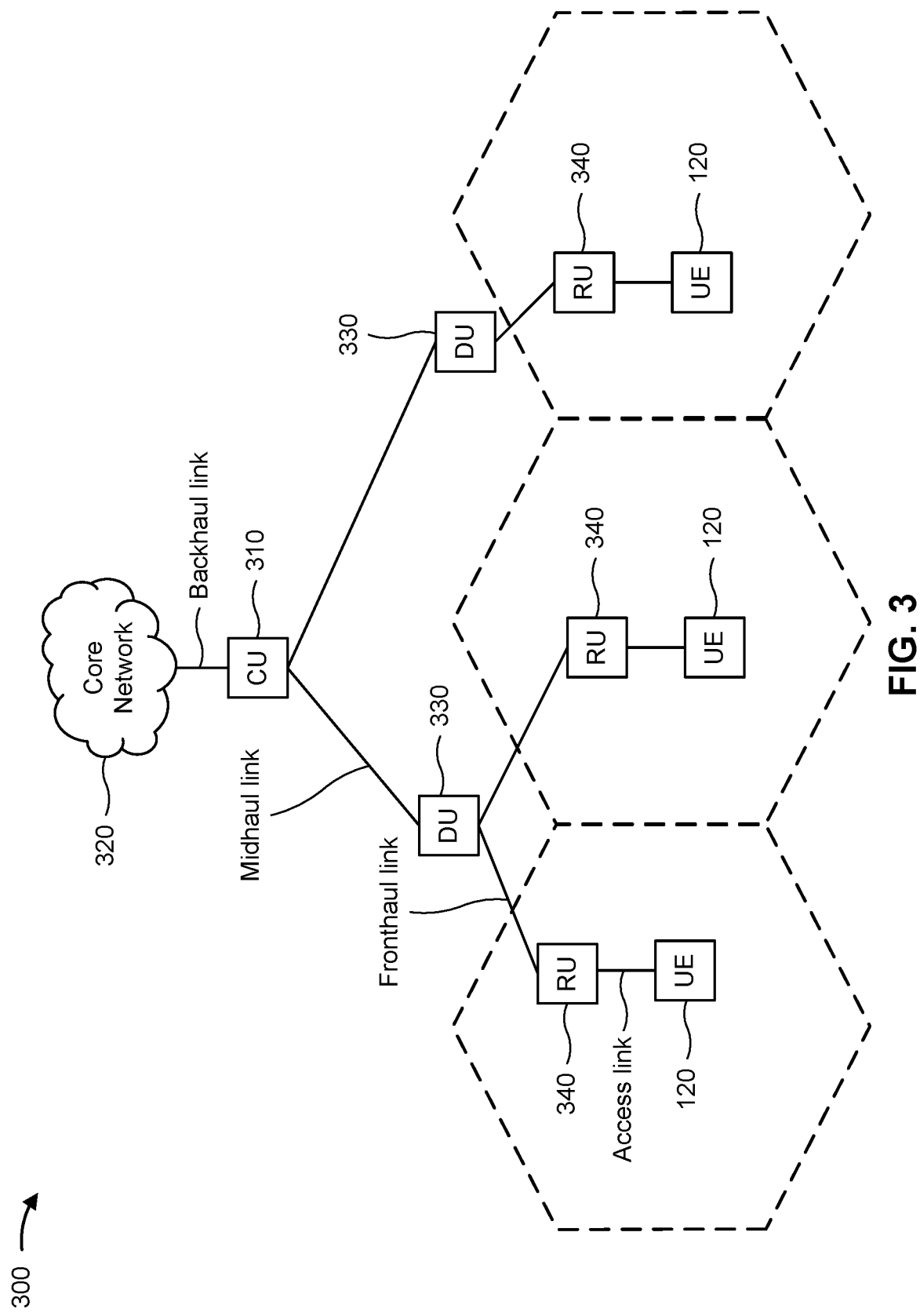
FIG. 3 is a diagram illustrating an example of an open radio access network (O-RAN) architecture, in accordance with the present disclosure.

FIG. 3 is a diagram illustrating an example 300 of an open radio access network (O-RAN) architecture, in accordance with the present disclosure. As shown in FIG. 3, the O-RAN architecture may include a control unit (CU) 310 that communicates with a core network 320 via a backhaul link. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

The DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. The DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based radio access network (RAN) architecture.

As indicated above, FIG. 3 is provided as an example. Other examples may differ from what is described with regard to FIG. 3.

Figure 4:
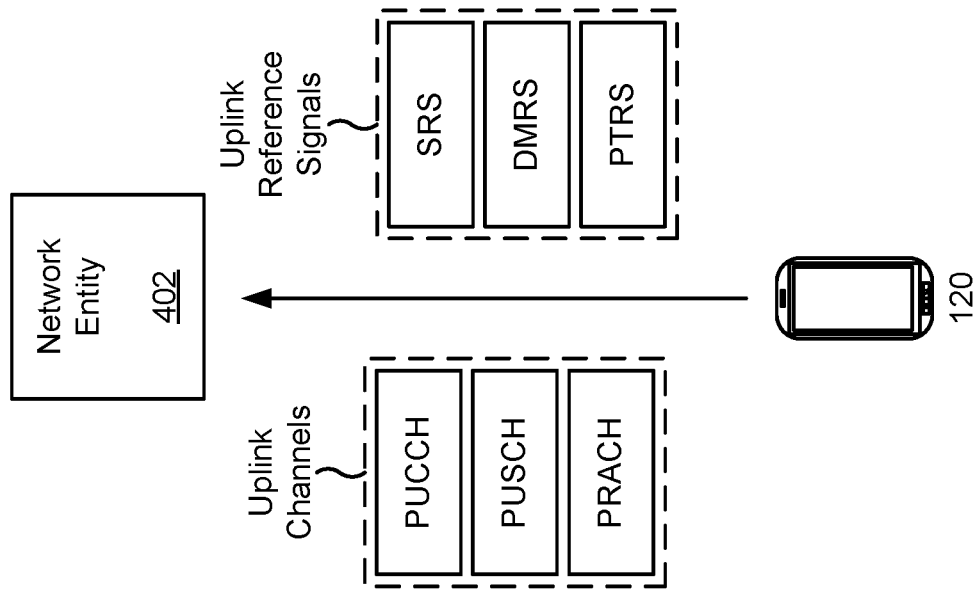
FIG. 4 is a diagram illustrating an example of physical channels and reference signals in a wireless network, in accordance with the present disclosure.
Figure 4:
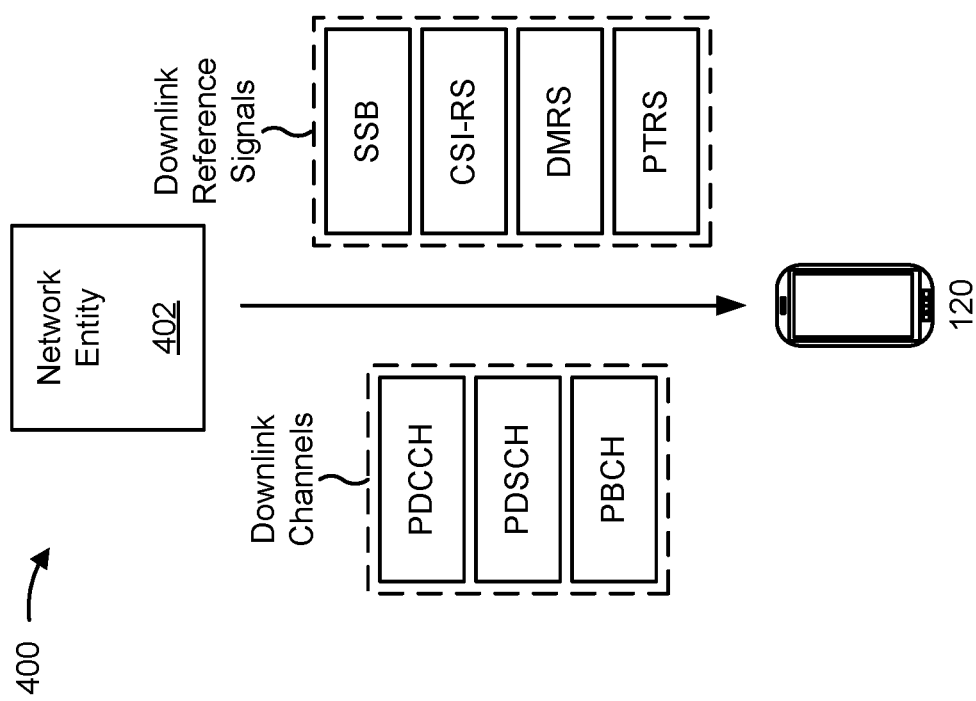

FIG. 4 is a diagram illustrating an example 400 of physical channels and reference signals in a wireless network, in accordance with the present disclosure. As shown in FIG. 4, downlink channels and downlink reference signals may carry information from a network entity 402 to a UE 120, and uplink channels and uplink reference signals may carry information from a UE 120 to a network entity 402.

As shown, a downlink channel may include a physical downlink control channel (PDCCH) that carries DCI, a physical downlink shared channel (PDSCH) that carries downlink data, or a physical broadcast channel (PBCH) that carries system information, among other examples. PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. The UE 120 may transmit acknowledgement (ACK) or negative acknowledgement (NACK) (ACK/NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. The network entity 402 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network entity 402 may configure a set of CSI-RSs for the UE 120, and the UE 120 may measure the configured set of CSI-RSs. Based at least in part on the measurements, the UE 120 may perform channel estimation and may report channel estimation parameters to the network entity 402 (e.g., in a CSI report), such as a CQI, a precoding matrix indicator (PMI), a CSI-RS resource indicator (CRI), a layer indicator (LI), a rank indicator (RI), or an RSRP, among other examples. The network entity 402 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network entity 402 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells) and may report a reference signal time difference (RSTD) based on OTDOA measurements associated with the PRSs received from the multiple cells. The network entity 402 may then calculate a position of the UE 120 based on the RSTD measurements reported by the UE 120.

An SRS may carry information used for uplink channel estimation, which may be used for scheduling, link adaptation, precoder selection, or beam management, among other examples. The network entity 402 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network entity 402 may measure the SRSs, may perform channel estimation based at least in part on the measurements and may use the SRS measurements to configure communications with the UE 120.

As indicated above, FIG. 4 is provided as an example. Other examples may differ from what is described with regard to FIG. 4.

Figure 5:
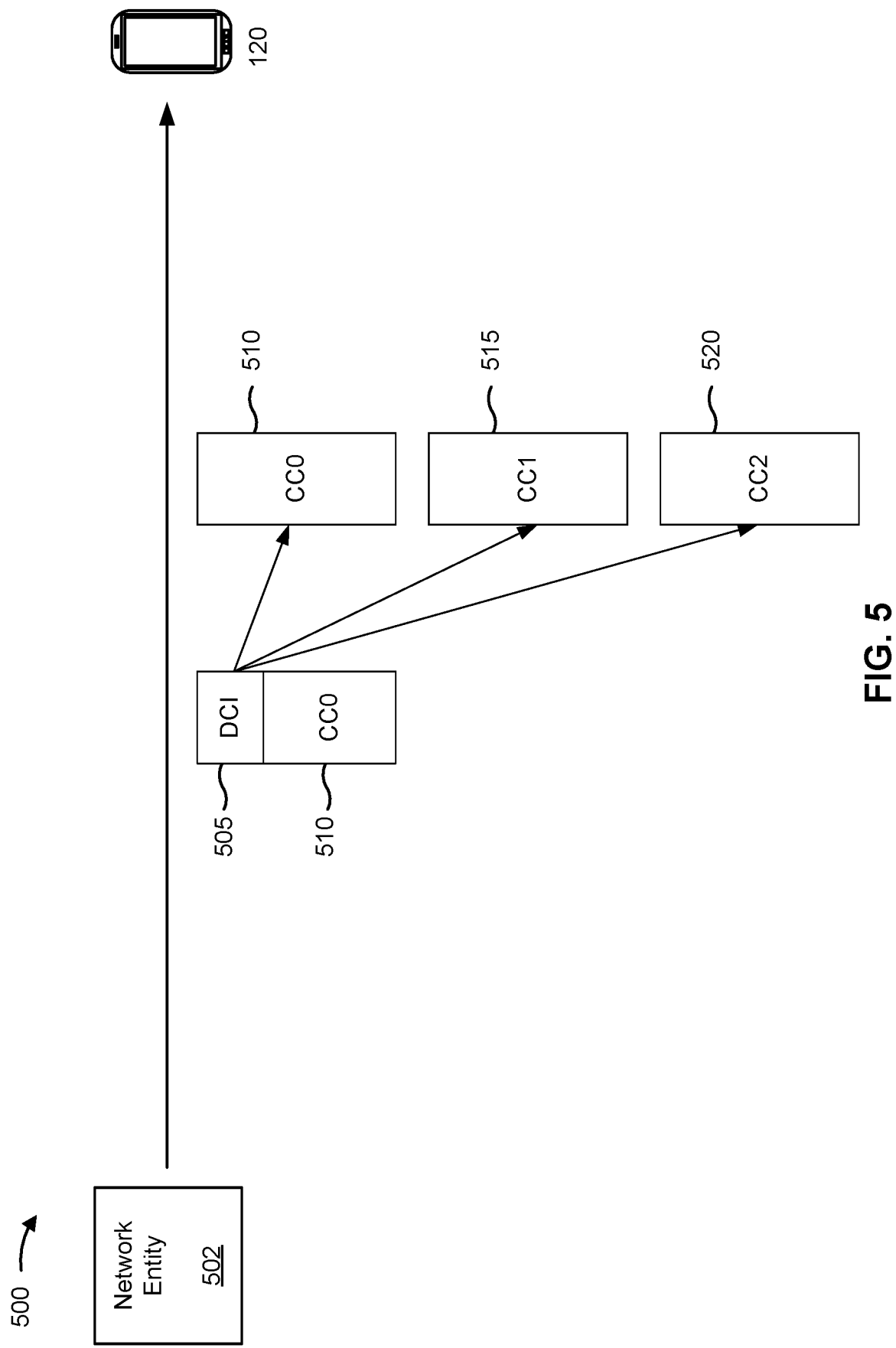
FIG. 5 is a diagram illustrating an example of downlink control information (DCI) that schedules multiple cells, in accordance with the present disclosure.

FIG. 5 is a diagram illustrating an example 500 of DCI that schedules multiple cells, in accordance with the present disclosure. As shown in FIG. 5, a network entity 502 and a UE 120 may communicate with one another.

The network entity 502 may transmit, to the UE 120, DCI 505 that schedules multiple communications for the UE 120. The multiple communications may be scheduled for at least two different cells. In some cases, a cell may be referred to as a "component carrier (CC)" or a "carrier." In some cases, DCI that schedules a communication for a cell via which the DCI is transmitted may be referred to as "self-carrier" or "self-cell" scheduling DCI. In some cases, DCI that schedules a communication for a cell via which the DCI is transmitted may be referred to as "cross-carrier" or "cross-cell" scheduling DCI. The DCI 505 may be cross-carrier scheduling DCI and may or may not be self-carrier scheduling DCI. The DCI 505 that carries communications in at least two cells may be referred to as combination DCI.

In example 500, the DCI 505 schedules a communication for a first cell 510 that carries the DCI 505 (shown as CC0), schedules a communication for a second cell 515 that does not carry the DCI 505 (shown as CC1), and schedules a communication for a third cell 520 that does not carry the DCI 505 (shown as CC2). The DCI 505 may schedule communications on a different number of cells than shown in FIG. 5 (e.g., two cells, four cells, five cells, and so on). The number of cells may be greater than or equal to two.

A communication scheduled by the DCI 505 may include a data communication, such as a PDSCH communication or a PUSCH communication. For a data communication, the DCI 505 may schedule a single transport block (TB) across multiple cells or may separately schedule multiple TBs in the multiple cells. Additionally, or alternatively, a communication scheduled by the DCI 505 may include a reference signal, such as a CSI-RS or an SRS. For a reference signal, the DCI 505 may trigger a single resource for reference signal transmission across multiple cells or may separately schedule multiple resources for reference signal transmission in the multiple cells. In some cases, scheduling information in the DCI 505 may be indicated once and reused for multiple communications (e.g., on different cells), such as an MCS, a resource to be used for ACK or NACK of a communication scheduled by the DCI 505, and/or a resource allocation for a scheduled communication, to conserve signaling overhead.

As indicated above, FIG. 5 is provided as an example. Other examples may differ from what is described with respect to FIG. 5.

As described above, a DCI may have a DCI format that includes a set of fields for multi-cell scheduling. For example, a network entity may transmit a single DCI to schedule a PUSCH and/or a PDSCH on a set of cells of the single DCI. In this case, the network entity may configure the single DCI to schedule a set of cells by RRC signaling (e.g., the network entity may configure the UE, such that the UE can interpret the single DCI as scheduling a set of cells). However, the single DCI may schedule one, some, or all of the configured set of cells. Similarly, the single DCI may, in some cases, be configured to schedule up to 110 resource blocks (RBs) in a cell, but may actually schedule one, some, or all of the up to 110 RBs for a particular cell.

The network entity may transmit a DCI with a particular format and with a CRC scrambled with a CS-RNTI to activate or release downlink (DL) semi-persistent scheduling (SPS) (DL-SPS) resources or uplink (UL) configured grant (CG) (UL-CG) resources. Similarly, the network entity may schedule retransmission of a DL-SPS transmission or a UL-CG transmission using a DCI with a particular format and a CRC scrambled using a CS-RNTI. When the network entity configures a UE to interpret the particular DCI format as including an activation, release, or retransmission for DL-SPS resources of UL-CG resources, the UE may monitor for the particular DCI format with a CRC scrambled by a CS-RNTI as well as for the particular DCI format scrambled with a C-RNTI. The CS-RNTI scrambled DCI (the DCI with a CRC scrambled using a CS-RNTI) and the C-RNTI scrambled DCI (the DCI with a CRC scrambled using a C-RNTI) may each have the same DCI size with the same set of control channel elements (CCE). In other words, the CS-RNTI scrambled DCI and the C-RNTI scrambled DCI may only be distinguishable from whether the CRC is scrambled with the CS-RNTI or the C-RNTI.

When the UE is configured with cross-carrier scheduling, a DCI may include a carrier indicator field (CIF), which indicates for which scheduled cell the DCI format of the DCI is applicable. In this case, the network entity can configure a mapping between each CIF value and a scheduled cell using RRC signaling and may be common across all of dynamic PDSCH or PUSCH scheduling, DL-SPS activation, release, or retransmission, UL-CG activation, release, or retransmission, and CG downlink feedback information DFI (CG-DFI). However, when multi-cell scheduling by a single DCI is configured, a network entity and a UE may not be synchronized with regard to how to distinguish and interpret DCIs with the same DCI size and CCEs, which may prevent the UE from using the DCI to successfully determine on which resources to communicate with the network entity and/or what information to communicate with the network entity.

Some aspects described herein enable transmission of DFI with DCI for multi-cell scheduling. For example, a UE monitor for DCI format for PDSCH or PUSCH scheduling of up to N cells and may check whether a C-RNTI or a CS-RNTI decoded candidate passes a CRC. In this case, when the C-RNTI decoded candidate passes the CRC, the UE decodes the DCI as scheduling up to N cells for PDSCH or PUSCH communication. Alternatively, when the CS-RNTI decoded candidate passes the CRC, the UE decodes the DCI as for DL-SPS or UL-CG activation, release, or retransmission signaling or for CG-DFI signaling. In other words, in multi-cell scheduling, the network entity and the UE use C-RNTI or CS-RNTI encoding and decoding to distinguish between how the UE is to interpret a DCI for subsequent communication.

Figure 6A:
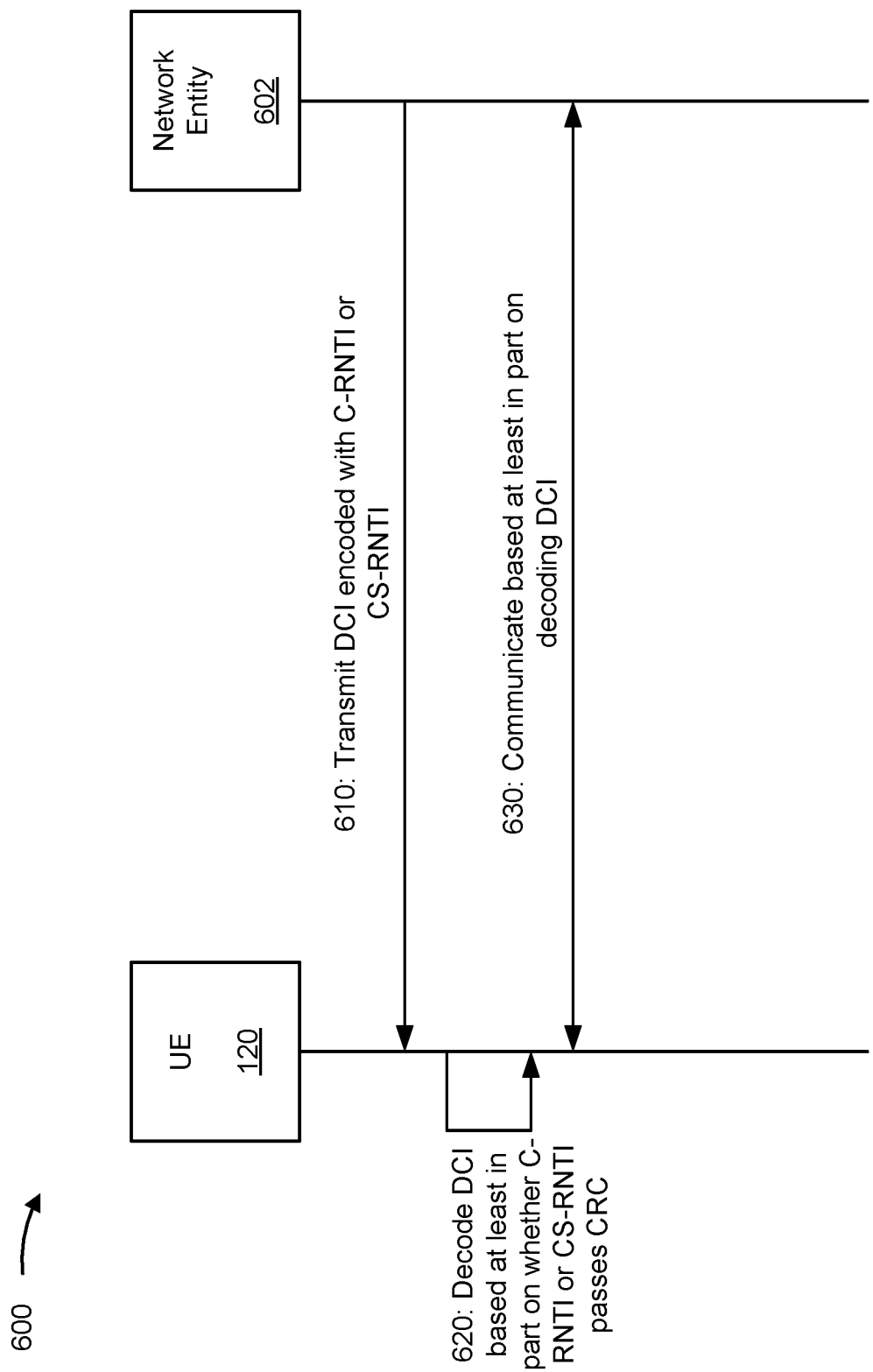

FIGS. 6A-6E are diagrams illustrating an example 600 associated with transmission of DFI with DCI for multi-cell scheduling, in accordance with the present disclosure. As shown in FIGS. 6A, example 600 includes communication between a network entity 602 and a UE 120.

As further shown in FIG. 6A, and by reference number 610, network entity 602 may transmit DCI encoded with a C-RNTI or a CS-RNTI. For example, the UE 120 may monitor a set of resources (e.g., configured for the UE 120 by the network entity 602 using RRC signaling), and the network entity 602 may transmit the DCI in the set of resources. In this case, the UE 120 may receive the DCI in the set of resources.

As further shown in FIG. 6A, and by reference numbers 620 and 630, UE 120 may decode the DCI based at least in part on whether a C-RNTI or CS-RNTI passes a CRC and communicate with the network entity 602 based at least in part on decoding the DCI. For example, the UE 120 may decode a candidate (e.g., data of the DCI) and determine whether a C-RNTI of the decoded candidate passes or satisfies the CRC (e.g., which indicates that the CRC is scrambled using the C-RNTI). In this case, if the C-RNTI passes the CRC, the UE 120 decodes the DCI and determines that the DCI is for PDSCH or PUSCH scheduling of up to N cells. As described above, although the DCI is configured for scheduling an RRC configured set of cells (multi-cell scheduling), the DCI may actually only schedule a single cell, a subset of the set of cells, or the whole set of cells. Alternatively, the UE 120 may determine whether a CS-RNTI of the decoded candidate passes or satisfies the CRC. In this case, the UE may determine that the CS-RNTI of the decoded candidate passes the CRC, decode the DCI, and determine that the DCI is for DL-SPS or UL-CG activation, release, or retransmission configuration and/or for CG-DFI transmission.

Figure 6B:
Figure 6B:
Figure 6B:

In some aspects, when the CS-RNTI satisfies the CRC, the UE 120 may determine a configuration for a single cell of the set of N cells for which the DCI is configured for scheduling (e.g., a DL-SPS or UL-CG activation, release, or re-transmission configuration). For example, the network entity 602 may configure DL-SPS transmission or UL-CG transmission on a single cell of the N cells. In this case, the UE 120 may identify the DCI and the associated N cells that can be scheduled by the DCI, and the UE 120 may determine the configuration that the DCI indicates. For example, as shown in FIG. 6B, and by reference number 650, the UE 120 may map one or more values of a CIF field in the DCI to one or more cells for dynamic PDSCH or PUSCH scheduling, but to only one cell for DL-SPS or UL-CG activation, release, or re-transmission. Here, CIF value '3' maps to three carriers CC #4, CC #5, and CC #6 for dynamic PDSCH or PUSCH scheduling, but to only CC #5 for DL-SPS or UL-CG activation, release, or re-transmission. Accordingly, the UE 120 may communicate with the network entity 602 on CC #5 in accordance with a configuration of the DCI (e.g., the UE 120 may transmit a UL-CG transmission, may determine that the network entity 602 has released a DL-SPS resource, etc.).

Additionally, or alternatively, as shown in FIG. 6B and by reference number 652, when the UE 120 maps the one or more values of the CIF field in the DCI to a plurality of cells for DL-SPS or UL-CG activation, release, or re-transmission, the UE 120 may use a rule for resolving to which of the plurality of cells the configuration of the DCI applies. Here, CIF value '2' and '3' each map to a plurality of carriers. In some aspects, the UE 120 may select a carrier of the plurality of carriers based at least in part on a timing (e.g., an index of a subframe, slot, symbol, etc.) where the DCI is detected by the UE 120. Additionally, or alternatively, the UE 120 may select a carrier based at least in part on a PDCCH (e.g., a search space index, a control resource set (CORESET) index, a CCE index of a search space set) where the DCI is detected. Additionally, or alternatively, the network entity 602 may include an indication in the DCI (e.g., in a frequency domain resource allocation (FDRA) field for a cell) of which carrier the UE 120 is to select.

Additionally, or alternatively, as shown in FIG. 6B, and by reference number 652, the UE 120 may determine the carrier based at least in part on a received indication (e.g., received in RRC, medium access control (MAC) control element (CE), or DCI signaling). For example, to enable multi-cell scheduling by a DCI with a C-RNTI, one or more CIF values in the DCI may map to more than one cell (e.g., CIF value '3' maps to carriers CC #4, CC #5, and CC #6). In this case, for a DCI with the same CIF value with a CS-RNTI, the network entity 602 may transmit an indication to select a particular carrier for DL-SPS or UL-CG activation, release, or retransmission.

Additionally, or alternatively, as shown in FIG. 6B, and by reference number 654, the network entity 602 may configure DL-SPS transmission or UL-CG transmission on a single cell of none of the N cells (the single cell is a cell not belonging to the N cells). The UE 120 may map one or more values of a CIF field in the DCI to one or more cells for dynamic PDSCH or PUSCH scheduling, but to only one cell for DL-SPS or UL-CG activation, release, or re-transmission, where the cell for DL-SPS or UL-CG activation, release, or re-transmission, is none of the one or more cells for dynamic PDSCH or PUSCH scheduling. Here, CIF value '2' maps to two carriers CC #2 and CC #3 for dynamic PDSCH or PUSCH scheduling, but to CC #4 for DL-SPS or UL-CG activation, release, or re-transmission. Accordingly, the UE 120 may communicate with the network entity 602 on CC #4 in accordance with a configuration of the DCI (e.g., the UE 120 may transmit a UL-CG transmission, may determine that the network entity 602 has released a DL-SPS resource, etc.). In this case, as shown by reference number 654, for CIF value '2', the UE 120 may use a received indication that CC #4 is to be selected.

Figure 6C:
Figure 6C:

In some aspects, when the CS-RNTI satisfies the CRC, the UE 120 may determine a configuration for one or more cells of the set of N cells for which the DCI is configured for scheduling (e.g., a DL-SPS or UL-CG activation, release, or re-transmission configuration). For example, the network entity 602 may configure DL-SPS transmission or UL-CG transmission on one or more of the N cells. In this case, to enable multi-cell scheduling by a DCI with a C-RNTI, one or more CIF values in the DCI map to more than one cell, as shown in FIG. 6C, and by reference number 660. For a DCI with a CIF value with a CS-RNTI, one or more cells can be indicated as having the DL-SPS or UL-CG activation, release, or re-transmission configuration of the DCI. In this case, the UE 120 may identify on which cells the DL-SPS or UL-CG activation, release, or re-transmission configuration is applicable based at least in part on another DCI field, such as an FDRA field or a hybrid automatic repeat request (HARQ) process number field, among other examples. Reference number 660 shows an example, of when the one or more cells are a subset of the N cells, however, as shown by reference number 662, the one or more cells may not be limited to a subset of the N cells.

In some aspects, the UE 120 may determine whether the DCI conveys a CG-DFI for PUSCH transmissions on one or more cells based at least in part on a DFI flag. For example, when a DFI flag is set to a configured value (e.g., '1') in the DCI and the DCI has a CRC scrambled by a CS-RNTI, the UE 120 may determine that the DCI conveys a CG-DFI. In this case, the DCI may include one or more fields to convey HARQ-ACK information corresponding to transport blocks of PUSCH transmissions for a set of HARQ processes for a serving cell indicated by the DCI. In some aspects, when the CIF field is present, the UE 120 may determine the serving cell indicated by the DCI based at least in part on the CIF field. Additionally, or alternatively, when the CIF field is not present, the UE 120 may determine the serving cell indicated by the DCI based at least in part on the serving cell on which the DCI is received. Additionally, or alternatively, the UE 120 may map a transmit power control (TPC) command field for a PUSCH in the serving cell to which the DCI applies. In some aspects, the UE 120 may map HARQ-ACK feedback to HARQ processes using a configured order. For example, the UE 120 may map a 16-bit bitmap of the DCI to a set of 16 HARQ processes in ascending order from most significant bit (MSB) to least significant bit (LSB) and in order of an index of each of the 16 HARQ processes. In some aspects, when the DCI conveys a CG-DFI, a set of bits may have values for the HARQ-ACK feedback, but other fields of the DCI may be set to a configured value (e.g., '0') rather than conveying other information.

In some aspects, when the UE 120 determines that the DCI conveys a CG-DFI for PUSCH transmissions on one or more cells, the UE 120 may identify the one or more cells for the PUSCH transmissions based at least in part on a configured mapping. For example, as shown in FIG. 6D, and by reference number 670, the UE 120 may select among a set of cells that are mapped to a CIF value based at least in part on respective indices of the set of cells (e.g., the UE 120 may select a cell having a lowest index). Here, as shown by reference number 670, for CIF value '2', which maps to CC #2 and CC #3 for dynamic PDSCH or PUSCH scheduling, the UE 120 may select CC #2 for a CG-DFI based at least in part on CC #2 having a lower index than CC #3. Additionally, or alternatively, the UE 120 may select the carrier that has a UL-CG configuration (e.g., when the UL-CG configuration is only on one of the one or more cells and the remainder of the one or more cells have, for example, a DL-SPS configuration). Additionally, or alternatively, as shown by reference number 672, the UE 120 may have a configured mapping dedicated for CG-DFI (e.g., separate from the mapping to carriers for dynamic PDSCH or PUSCH scheduling). Additionally, or alternatively, as shown by reference number 674, the UE 120 may have a configured mapping for more than one cell (e.g., for at least one of the CIF values). In this case, the UE 120 may select from the more than one cell based at least in part on a rule (e.g., all cells, all cells with UL-CG configurations, etc.) or based at least in part on a dedicated mapping.

Figure 6E:
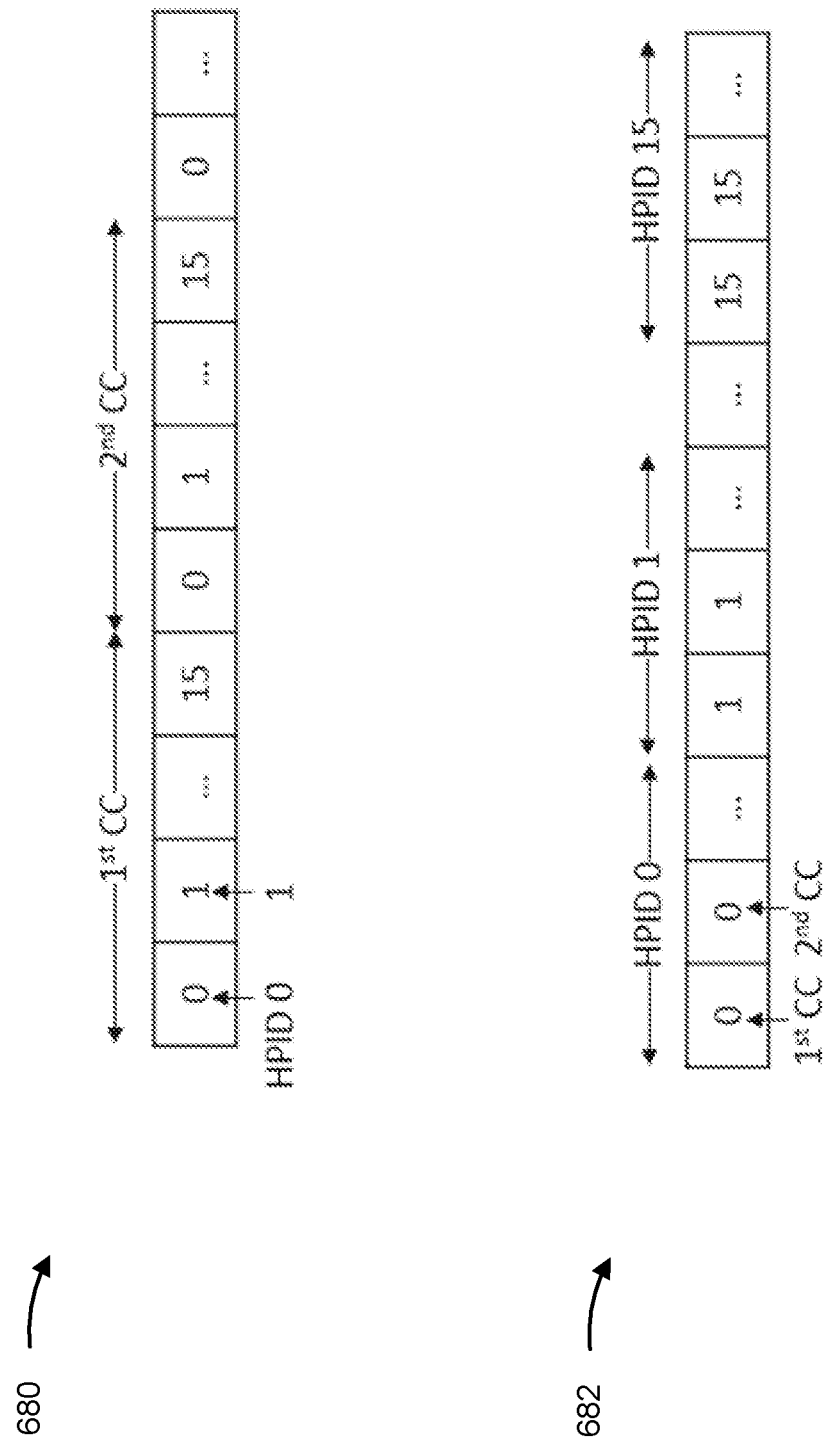

In some aspects, the UE 120 may interpret the DCI with a DFI flag with a configured value as including a HARQ-ACK bitmap for one or more cells. For example, the UE 120 may interpret the bitmap, as shown in FIG. 6E and by reference number 680, to include HARQ process indices for a first cell (e.g., a first CC) mapped in ascending order in a first sub-bitmap, for a second cell (e.g., a second CC) mapped in ascending order in a second sub-bitmap, etc. to form the HARQ-ACK bitmap (e.g., by concatenation of the sub-bitmaps). Additionally, or alternatively, the UE 120 may interpret the bitmap, as shown by reference number 682, to include different cells mapped in ascending order of cell indices for each HARQ process identifier (HPID), which are concatenated to form the bitmap. In other words, a first sub-bitmap for HPID 0 includes HARQ feedback for a set of carriers in ascending order of index, a second sub-bitmap for HPID 1 includes HARQ feedback for the set of carriers in ascending order of index, etc. concatenated to form the bitmap.

In some aspects, the UE 120 may interpret the DCI with a DFI flag with a configured value as including a TPC command for one or more PUSCHs. For example, the UE 120 may identify a single TPC command field and apply a value in the single TPC command field to a set of serving cells where the DCI includes HARQ-ACK information of PUSCH transmissions on the set of serving cells. Additionally, or alternatively, the UE 120 may identify a set of TPC command fields applicable to the set of serving cells (e.g., by a one-to-one mapping). Additionally, or alternatively, the UE 120 may map at least one TPC command to more than one serving cell and at least one TPC command to a single serving cell (e.g., a combination of one-to-one mapping and one-to-many-mapping). In this case, the UE 120 may subsequent transmit PUSCH transmissions to the network entity 602 using transmit powers based at least in part on one or more TPC commands included in the DCI.

As indicated above, FIGS. 6A-6E are provided as an example. Other examples may differ from what is described with respect to FIGS. 6A-6E.

Figure 7:
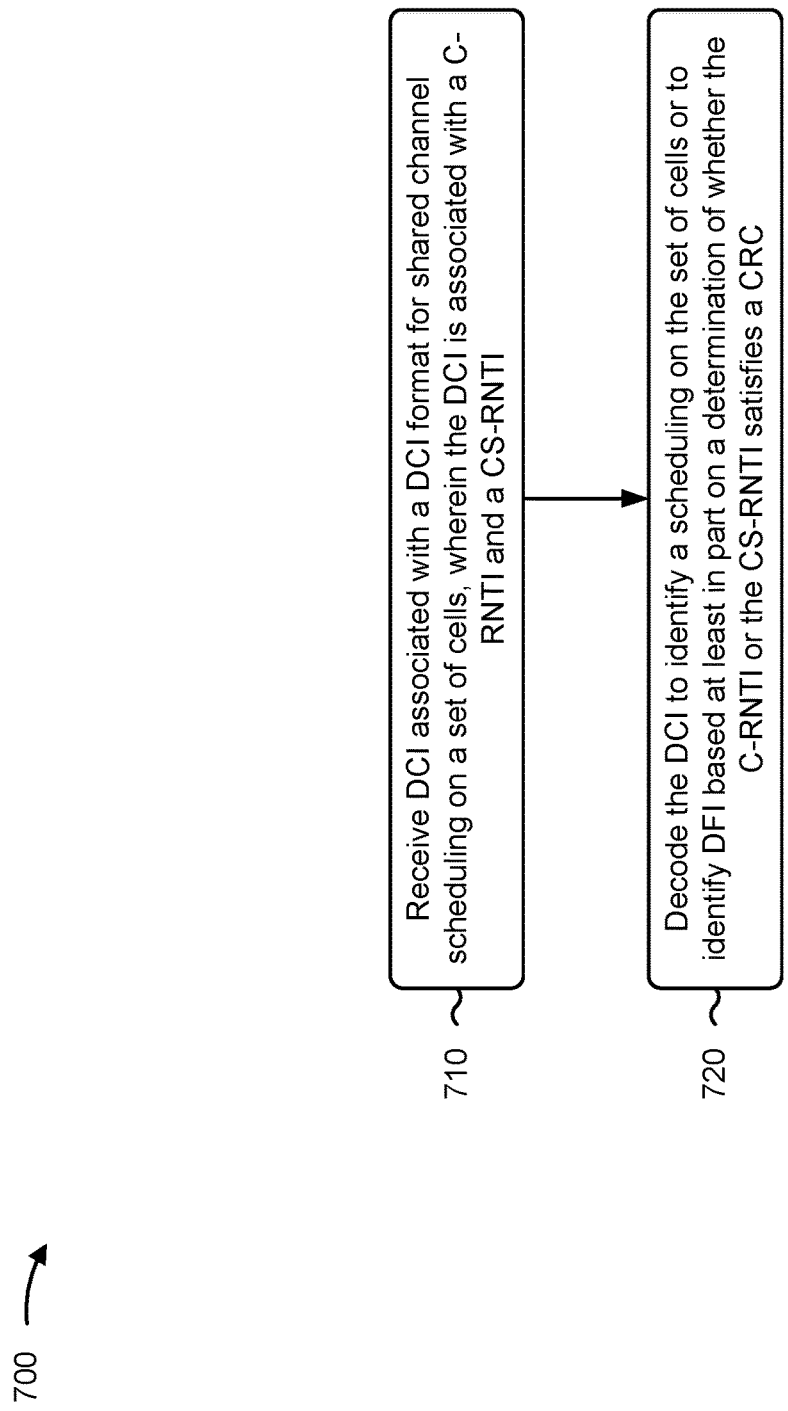
FIGS. 7-8 are diagrams illustrating example processes associated with transmission of DFI with DCI for multi-cell scheduling, in accordance with the present disclosure.

FIG. 7 is a diagram illustrating an example process 700 performed, for example, by a UE, in accordance with the present disclosure. Example process 700 is an example where the UE (e.g., UE 120) performs operations associated with transmission of DFI with DCI for multi-cell scheduling.

As shown in FIG. 7, in some aspects, process 700 may include receiving DCI associated with a DCI format for shared channel scheduling on a set of cells, wherein the DCI is associated with a C-RNTI and a CS-RNTI (block 710). For example, the UE (e.g., using communication manager 140 and/or reception component 902, depicted in FIG. 9) may receive DCI associated with a DCI format for shared channel scheduling on a set of cells, wherein the DCI is associated with a C-RNTI and a CS-RNTI, as described above, for example, with reference to FIGS. 6A-6E.

As further shown in FIG. 7, in some aspects, process 700 may include decoding the DCI to identify a scheduling on the set of cells or to identify DFI based at least in part on a determination of whether the C-RNTI or the CS-RNTI satisfies a CRC (block 720). For example, the UE (e.g., using communication manager 140 and/or the decoding component 908, depicted in FIG. 9) may decode the DCI to identify a scheduling on the set of cells or to identify DFI based at least in part on a determination of whether the C-RNTI or the CS-RNTI satisfies a CRC, as described above, for example, with reference to FIGS. 6A-6E.

Process 700 may include additional aspects, such as any single aspect or any combination of aspects described below and/or in connection with one or more other processes described elsewhere herein.

In a first aspect, the CS-RNTI satisfies the CRC, and wherein the DCI is configured for activation, release, or retransmission for a single cell in a downlink semi-persistent scheduling scenario or an uplink configured grant scenario.

In a second aspect, alone or in combination with the first aspect, the single cell is based at least in part on a cell configured with downlink semi-persistent scheduling or configured with an uplink configured grant from the set of cells for which the DCI format for shared channel scheduling is associated.

In a third aspect, alone or in combination with one or more of the first and second aspects, the single cell is based at least in part on a received indication of the single cell.

In a fourth aspect, alone or in combination with one or more of the first through third aspects, the CS-RNTI satisfies the CRC, and wherein the DCI is configured for activation, release, or retransmission for one or more cells in a downlink semi-persistent scheduling scenario or an uplink configured grant scenario.

In a fifth aspect, alone or in combination with one or more of the first through fourth aspects, the one or more cells is based at least in part on a subset of one or more cells from the set of cells for which the DCI format for shared channel scheduling is associated.

In a sixth aspect, alone or in combination with one or more of the first through fifth aspects, the one or more cells includes at least one cell other than a group of cells monitored for receiving the DCI.

In a seventh aspect, alone or in combination with one or more of the first through sixth aspects, the DCI includes a configured grant DFI for shared channel transmissions on a single cell.

In an eighth aspect, alone or in combination with one or more of the first through seventh aspects, the single cell is based at least in part on a mapping of a carrier indicator field to a carrier.

In a ninth aspect, alone or in combination with one or more of the first through eighth aspects, the DCI includes a configured grant DFI for shared channel transmissions on one or more cells.

In a tenth aspect, alone or in combination with one or more of the first through ninth aspects, the one or more cells are based at least in part on a mapping of a carrier indicator field to one or more carriers.

In an eleventh aspect, alone or in combination with one or more of the first through tenth aspects, the DCI includes a HARQ ACK bitmap for the one or more cells.

In a twelfth aspect, alone or in combination with one or more of the first through eleventh aspects, a first set of HARQ process indices for a first cell, of the one or more cells, are mapped in a static order and concatenated to a second set of HARQ process indices for a second cell, of the one or more cells, to form the HARQ ACK bitmap.

In a thirteenth aspect, alone or in combination with one or more of the first through twelfth aspects, a first HARQ process index for the one or more cells forms a first sub-bitmap, of the HARQ ACK bitmap, which is concatenated to a second sub-bitmap corresponding to a second HARQ process index for the one or more cells to form the HARQ ACK bitmap.

In a fourteenth aspect, alone or in combination with one or more of the first through thirteenth aspects, the DCI includes at least one TPC command field for at least one uplink shared channel.

In a fifteenth aspect, alone or in combination with one or more of the first through fourteenth aspects, the at least one TPC command field is a single TPC command field applicable to each serving cell for which HARQ ACK information of the at least one uplink shared channel is included in the DCI.

In a sixteenth aspect, alone or in combination with one or more of the first through fifteenth aspects, the at least one TPC command field is a set of TPC command fields applicable to a group of cells for which HARQ ACK information of the at least one uplink shared channel is included in the DCI.

In a seventeenth aspect, alone or in combination with one or more of the first through sixteenth aspects, the at least one TPC command field includes a first TPC command applicable to a single cell for which HARQ ACK information is included in the DCI and a second TPC command applicable to a group of cells for which HARQ ACK information is included in the DCI.

In an eighteenth aspect, alone or in combination with one or more of the first through seventeenth aspects, one or more trailing bits in the DCI are set to zero based at least in part on the DCI identifying the scheduling on the set of cells or identifying the DFI.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
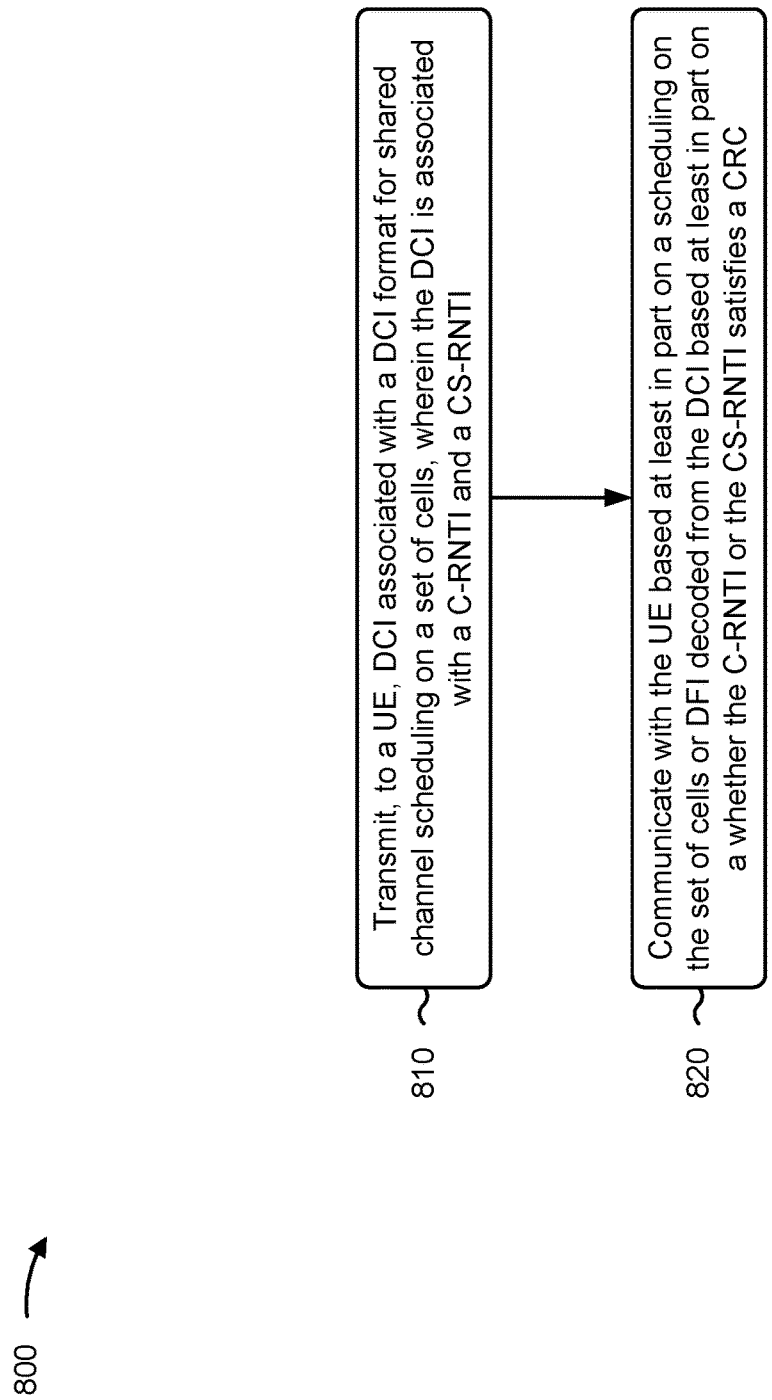

FIG. 8 is a diagram illustrating an example process 800 performed, for example, by a network entity, in accordance with the present disclosure. Example process 800 is an example where the network entity (e.g., a base station 110, a CU 310, a DU 330, an RU 340, a network entity 402, a network entity 502, or a network entity 602, among other examples) performs operations associated with transmission of DFI with DCI for multi-cell scheduling.

As shown in FIG. 8, in some aspects, process 800 may include transmitting, to a UE, DCI associated with a DCI format for shared channel scheduling on a set of cells, wherein the DCI is associated with a C-RNTI and a CS-RNTI (block 810). For example, the network entity (e.g., using communication manager 150 and/or transmission component 1004, depicted in FIG. 10) may transmit, to a UE, DCI associated with a DCI format for shared channel scheduling on a set of cells, wherein the DCI is associated with a C-RNTI and a CS-RNTI, as described above, for example, with reference to FIGS. 6A-6E.

As further shown in FIG. 8, in some aspects, process 800 may include communicating with the UE based at least in part on a scheduling on the set of cells or DFI decoded from the DCI based at least in part on a whether the C-RNTI or the CS-RNTI satisfies a CRC (block 820). For example, the network entity (e.g., using communication manager 150 and/or reception component 1002 or transmission component 1004, depicted in FIG. 10) may communicate with the UE based at least in part on a scheduling on the set of cells or DFI decoded from the DCI based at least in part on a whether the C-RNTI or the CS-RNTI satisfies a CRC, as described above, for example, with reference to FIGS. 6A-6E.

Process 800 may include additional aspects, such as any single aspect or any combination of aspects described below and/or in connection with one or more other processes described elsewhere herein.

In a first aspect, the CS-RNTI satisfies the CRC, and wherein the DCI is configured for activation, release, or retransmission for a single cell in a downlink semi-persistent scheduling scenario or an uplink configured grant scenario.

In a second aspect, alone or in combination with the first aspect, the single cell is based at least in part on a cell configured with downlink semi-persistent scheduling or configured with an uplink configured grant from the set of cells for which the DCI format for shared channel scheduling is associated.

In a third aspect, alone or in combination with one or more of the first and second aspects, the single cell is based at least in part on a received indication of the single cell.

In a fourth aspect, alone or in combination with one or more of the first through third aspects, the CS-RNTI satisfies the CRC, and wherein the DCI is configured for activation, release, or retransmission for one or more cells in a downlink semi-persistent scheduling scenario or an uplink configured grant scenario.

In a fifth aspect, alone or in combination with one or more of the first through fourth aspects, the one or more cells is based at least in part on a subset of one or more cells from the set of cells for which the DCI format for shared channel scheduling is associated.

In a sixth aspect, alone or in combination with one or more of the first through fifth aspects, the one or more cells includes at least one cell other than a group of cells monitored for receiving the DCI.

In a seventh aspect, alone or in combination with one or more of the first through sixth aspects, the DCI includes a configured grant DFI for shared channel transmissions on a single cell.

In an eighth aspect, alone or in combination with one or more of the first through seventh aspects, the single cell is based at least in part on a mapping of a carrier indicator field to a carrier.

In a ninth aspect, alone or in combination with one or more of the first through eighth aspects, the DCI includes a configured grant DFI for shared channel transmissions on one or more cells.

In a tenth aspect, alone or in combination with one or more of the first through ninth aspects, the one or more cells are based at least in part on a mapping of a carrier indicator field to one or more carriers.

In an eleventh aspect, alone or in combination with one or more of the first through tenth aspects, the DCI includes a HARQ ACK bitmap for the one or more cells.

In a twelfth aspect, alone or in combination with one or more of the first through eleventh aspects, a first set of HARQ process indices for a first cell, of the one or more cells, are mapped in a static order and concatenated to a second set of HARQ process indices for a second cell, of the one or more cells, to form the HARQ ACK bitmap.

In a thirteenth aspect, alone or in combination with one or more of the first through twelfth aspects, a first HARQ process index for the one or more cells forms a first sub-bitmap, of the HARQ ACK bitmap, which is concatenated to a second sub-bitmap corresponding to a second HARQ process index for the one or more cells to form the HARQ ACK bitmap.

In a fourteenth aspect, alone or in combination with one or more of the first through thirteenth aspects, the DCI includes at least one TPC command field for at least one uplink shared channel.

In a fifteenth aspect, alone or in combination with one or more of the first through fourteenth aspects, the at least one TPC command field is a single TPC command field applicable to each serving cell for which HARQ ACK information of the at least one uplink shared channel is included in the DCI.

In a sixteenth aspect, alone or in combination with one or more of the first through fifteenth aspects, the at least one TPC command field is a set of TPC command fields applicable to a group of cells for which HARQ ACK information of the at least one uplink shared channel is included in the DCI.

In a seventeenth aspect, alone or in combination with one or more of the first through sixteenth aspects, the at least one TPC command field includes a first TPC command applicable to a single cell for which HARQ ACK information is included in the DCI and a second TPC command applicable to a group of cells for which HARQ ACK information is included in the DCI.

In an eighteenth aspect, alone or in combination with one or more of the first through seventeenth aspects, one or more trailing bits in the DCI are set to zero based at least in part on the DCI identifying the scheduling on the set of cells or identifying the DFI.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
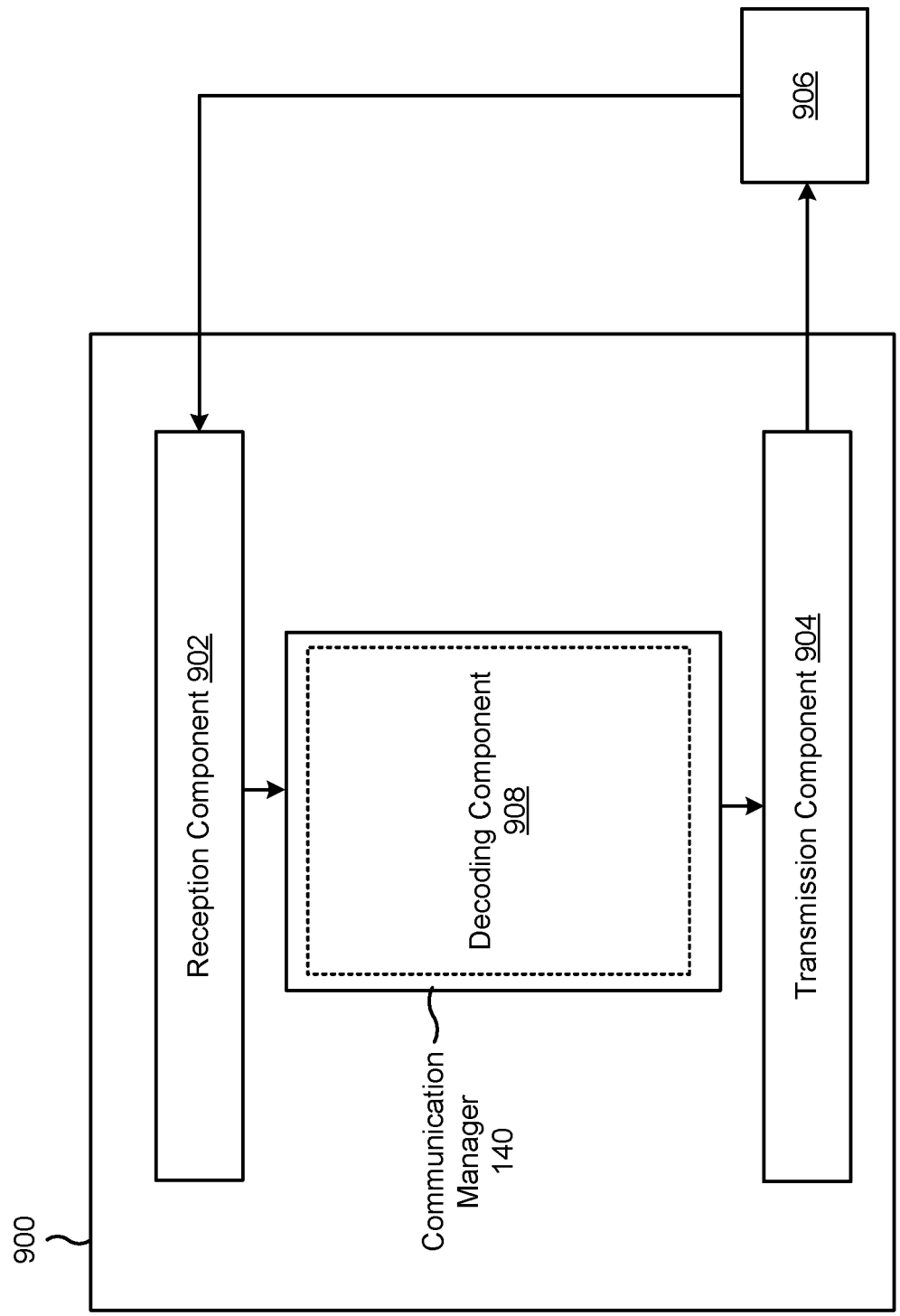
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a decoding component 908, among other examples.

In some aspects, the apparatus 900 may be configured to perform one or more operations described herein in connection with FIGS. 6A-6E. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples) and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples) and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive DCI associated with a DCI format for shared channel scheduling on a set of cells, wherein the DCI is associated with a C-RNTI and a CS-RNTI. The decoding component 908 may decode the DCI to identify a scheduling on the set of cells or to identify DFI based at least in part on a determination of whether the C-RNTI or the CS-RNTI satisfies a CRC.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
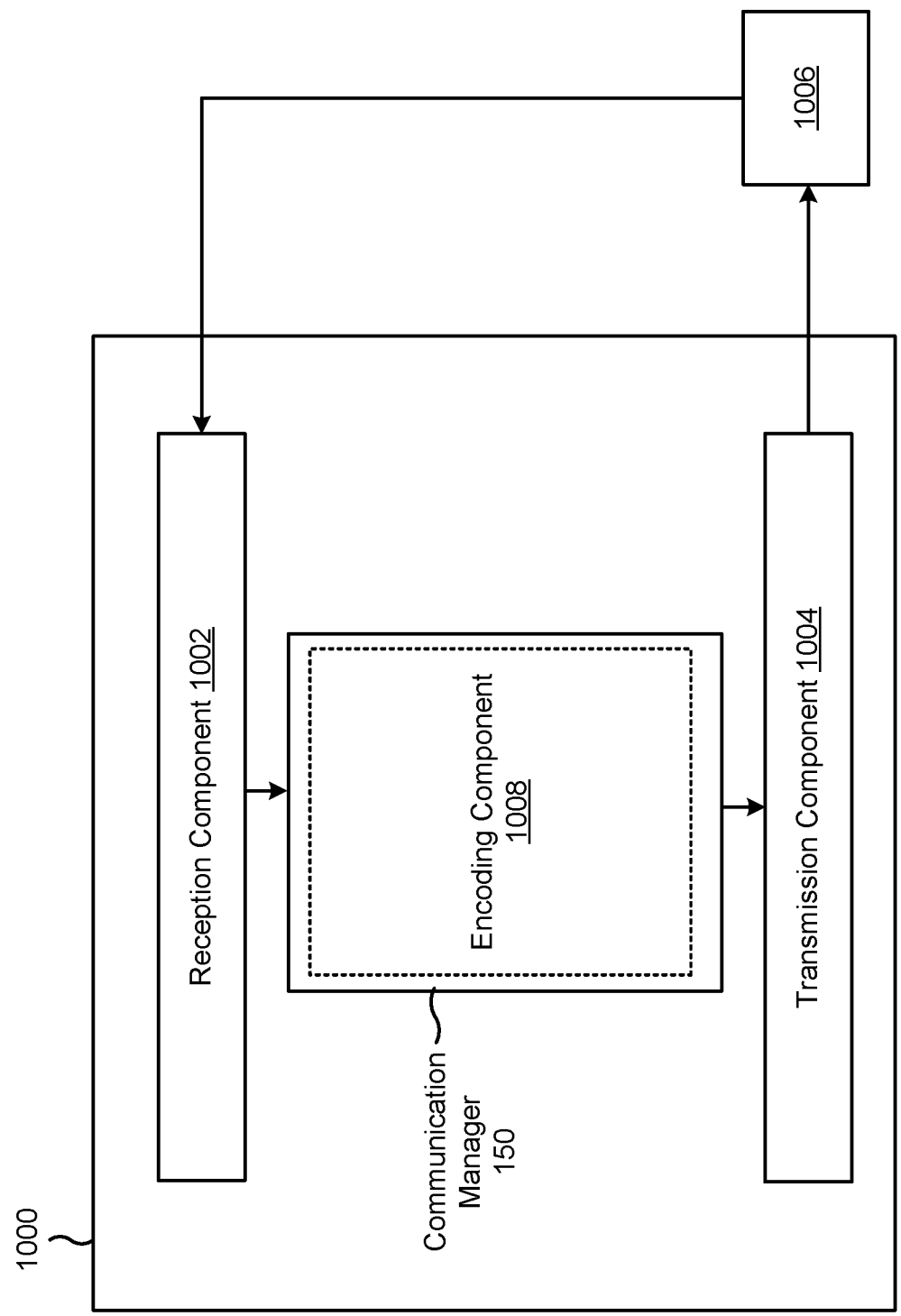

FIG. 10 is a diagram of an example apparatus 1000 for wireless communication. The apparatus 1000 may be a network entity, or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include an encoding component 1008, among other examples.

In some aspects, the apparatus 1000 may be configured to perform one or more operations described herein in connection with FIGS. 6A-6E. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network entity described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples) and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network entity described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples) and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network entity described in connection with FIG. 2. In some aspects, the transmission component 1004 may be co-located with the reception component 1002 in a transceiver.

The transmission component 1004 may transmit, to a UE, DCI associated with a DCI format for shared channel scheduling on a set of cells, wherein the DCI is associated with a C-RNTI and a CS-RNTI. The reception component 1002 and/or the transmission component 1004 may communicate with the UE based at least in part on a scheduling on the set of cells or DFI decoded from the DCI based at least in part on a whether the C-RNTI or the CS-RNTI satisfies a CRC. The encoding component 1008 may encode the DCI with a C-RNTI or a CS-RNTI to indicate whether the DCI includes scheduling on the set of cells or DFI.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving downlink control information (DCI) associated with a DCI format for shared channel scheduling on a set of cells, wherein the DCI is associated with a cell radio network temporary identifier (C-RNTI) and a configured scheduling radio network temporary identifier (CS-RNTI); and decoding the DCI to identify a scheduling on the set of cells or to identify downlink feedback information (DFI) based at least in part on a determination of whether the C-RNTI or the CS-RNTI satisfies a cyclic redundancy check (CRC).

Aspect 2: The method of Aspect 1, wherein the CS-RNTI satisfies the CRC, and wherein the DCI is configured for activation, release, or retransmission for a single cell in a downlink semi-persistent scheduling scenario or an uplink configured grant scenario.

Aspect 3: The method of Aspect 2, wherein the single cell is based at least in part on a cell configured with downlink semi-persistent scheduling or configured with an uplink configured grant from the set of cells for which the DCI format for shared channel scheduling is associated.

Aspect 4: The method of any of Aspects 2 to 3, wherein the single cell is based at least in part on a received indication of the single cell.

Aspect 5: The method of any of Aspects 1 to 4, wherein the CS-RNTI satisfies the CRC, and wherein the DCI is configured for activation, release, or retransmission for one or more cells in a downlink semi-persistent scheduling scenario or an uplink configured grant scenario.

Aspect 6: The method of Aspect 5, wherein the one or more cells is based at least in part on a subset of one or more cells from the set of cells for which the DCI format for shared channel scheduling is associated.

Aspect 7: The method of any of Aspects 5 to 6, wherein the one or more cells includes at least one cell other than a group of cells monitored for receiving the DCI.

Aspect 8: The method of any of Aspects 1 to 7, wherein the DCI includes a configured grant DFI for shared channel transmissions on a single cell.

Aspect 9: The method of Aspect 8, wherein the single cell is based at least in part on a mapping of a carrier indicator field to a carrier.

Aspect 10: The method of any of Aspects 1 to 9, wherein the DCI includes a configured grant DFI for shared channel transmissions on one or more cells.

Aspect 11: The method of Aspect 10, wherein the one or more cells are based at least in part on a mapping of a carrier indicator field to one or more carriers.

Aspect 12: The method of any of Aspects 10 to 11, wherein the DCI includes a hybrid automatic repeat request (HARQ) acknowledgment (ACK) bitmap for the one or more cells.

Aspect 13: The method of Aspect 12, wherein a first set of HARQ process indices for a first cell, of the one or more cells, are mapped in a static order and concatenated to a second set of HARQ process indices for a second cell, of the one or more cells, to form the HARQ ACK bitmap.

Aspect 14: The method of any of Aspects 12 to 13, wherein a first HARQ process index for the one or more cells forms a first sub-bitmap, of the HARQ ACK bitmap, which is concatenated to a second sub-bitmap corresponding to a second HARQ process index for the one or more cells to form the HARQ ACK bitmap.

Aspect 15: The method of any of Aspects 1 to 14, wherein the DCI includes at least one transmit power control (TPC) command field for at least one uplink shared channel.

Aspect 16: The method of Aspect 15, wherein the at least one TPC command field is a single TPC command field applicable to each serving cell for which hybrid automatic repeat request (HARQ) acknowledgment (ACK) information of the at least one uplink shared channel is included in the DCI.

Aspect 17: The method of any of Aspects 15 to 16, wherein the at least one TPC command field is a set of TPC command fields applicable to a group of cells for which hybrid automatic repeat request (HARQ) acknowledgment (ACK) information of the at least one uplink shared channel is included in the DCI.

Aspect 18: The method of any of Aspects 15 to 17, wherein the at least one TPC command field includes a first TPC command applicable to a single cell for which hybrid automatic repeat request (HARQ) acknowledgment (ACK) information is included in the DCI and a second TPC command applicable to a group of cells for which HARQ ACK information is included in the DCI.

Aspect 19: The method of any of Aspects 1 to 18, wherein one or more trailing bits in the DCI are set to zero based at least in part on the DCI identifying the scheduling on the set of cells or identifying the DFI.

Aspect 20: A method of wireless communication performed by a network entity, comprising: transmitting, to a user equipment (UE), downlink control information (DCI) associated with a DCI format for shared channel scheduling on a set of cells, wherein the DCI is associated with a cell radio network temporary identifier (C-RNTI) and a configured scheduling radio network temporary identifier (CS-RNTI); and communicating with the UE based at least in part on a scheduling on the set of cells or downlink feedback information (DFI) decoded from the DCI based at least in part on a whether the C-RNTI or the CS-RNTI satisfies a cyclic redundancy check (CRC).

Aspect 21: The method of Aspect 20, wherein the CS-RNTI satisfies the CRC, and wherein the DCI is configured for activation, release, or retransmission for a single cell in a downlink semi-persistent scheduling scenario or an uplink configured grant scenario.

Aspect 22: The method of Aspect 21, wherein the single cell is based at least in part on a cell configured with downlink semi-persistent scheduling or configured with an uplink configured grant from the set of cells for which the DCI format for shared channel scheduling is associated.

Aspect 23: The method of any of Aspects 21 to 22, wherein the single cell is based at least in part on a received indication of the single cell.

Aspect 24: The method of any of Aspects 20 to 22, wherein the CS-RNTI satisfies the CRC, and wherein the DCI is configured for activation, release, or retransmission for one or more cells in a downlink semi-persistent scheduling scenario or an uplink configured grant scenario.

Aspect 25: The method of Aspect 24, wherein the one or more cells is based at least in part on a subset of one or more cells from the set of cells for which the DCI format for shared channel scheduling is associated.

Aspect 26: The method of any of Aspects 20 to 25, wherein the one or more cells includes at least one cell other than a group of cells monitored for receiving the DCI.

Aspect 27: The method of any of Aspects 20 to 25, wherein the DCI includes a configured grant DFI for shared channel transmissions on a single cell.

Aspect 28: The method of Aspect 27, wherein the single cell is based at least in part on a mapping of a carrier indicator field to a carrier.

Aspect 29: The method of any of Aspects 20 to 28, wherein the DCI includes a configured grant DFI for shared channel transmissions on one or more cells.

Aspect 30: The method of Aspect 29, wherein the one or more cells are based at least in part on a mapping of a carrier indicator field to one or more carriers.

Aspect 31: The method of any of Aspects 29 to 30, wherein the DCI includes a hybrid automatic repeat request (HARQ) acknowledgment (ACK) bitmap for the one or more cells.

Aspect 32: The method of Aspect 31, wherein a first set of HARQ process indices for a first cell, of the one or more cells, are mapped in a static order and concatenated to a second set of HARQ process indices for a second cell, of the one or more cells, to form the HARQ ACK bitmap.

Aspect 33: The method of any of Aspects 31 to 32, wherein a first HARQ process index for the one or more cells forms a first sub-bitmap, of the HARQ ACK bitmap, which is concatenated to a second sub-bitmap corresponding to a second HARQ process index for the one or more cells to form the HARQ ACK bitmap.

Aspect 34: The method of any of Aspects 20 to 33, wherein the DCI includes at least one transmit power control (TPC) command field for at least one uplink shared channel.

Aspect 35: The method of Aspect 34, wherein the at least one TPC command field is a single TPC command field applicable to each serving cell for which hybrid automatic repeat request (HARQ) acknowledgment (ACK) information of the at least one uplink shared channel is included in the DCI.

Aspect 36: The method of any of Aspects 34 to 35, wherein the at least one TPC command field is a set of TPC command fields applicable to a group of cells for which hybrid automatic repeat request (HARQ) acknowledgment (ACK) information of the at least one uplink shared channel is included in the DCI.

Aspect 37: The method of any of Aspects 34 to 36, wherein the at least one TPC command field includes a first TPC command applicable to a single cell for which hybrid automatic repeat request (HARQ) acknowledgment (ACK) information is included in the DCI and a second TPC command applicable to a group of cells for which HARQ ACK information is included in the DCI.

Aspect 38: The method of any of Aspects 20 to 37, wherein one or more trailing bits in the DCI are set to zero based at least in part on the DCI identifying the scheduling on the set of cells or identifying the DFI.

Aspect 39: An apparatus for wireless communication at a device, comprising a processor; memory coupled with the processor; and instructions stored in the memory and executable by the processor to cause the apparatus to perform the method of one or more of Aspects 1-19.

Aspect 40: A device for wireless communication, comprising a memory and one or more processors coupled to the memory, the one or more processors configured to perform the method of one or more of Aspects 1-19.

Aspect 41: An apparatus for wireless communication, comprising at least one means for performing the method of one or more of Aspects 1-19.

Aspect 42: A non-transitory computer-readable medium storing code for wireless communication, the code comprising instructions executable by a processor to perform the method of one or more of Aspects 1-19.

Aspect 43: A non-transitory computer-readable medium storing a set of instructions for wireless communication, the set of instructions comprising one or more instructions that, when executed by one or more processors of a device, cause the device to perform the method of one or more of Aspects 1-19.

Aspect 44: An apparatus for wireless communication at a device, comprising a processor; memory coupled with the processor; and instructions stored in the memory and executable by the processor to cause the apparatus to perform the method of one or more of Aspects 20-38.

Aspect 45: A device for wireless communication, comprising a memory and one or more processors coupled to the memory, the one or more processors configured to perform the method of one or more of Aspects 20-38.

Aspect 46: An apparatus for wireless communication, comprising at least one means for performing the method of one or more of Aspects 20-38.

Aspect 47: A non-transitory computer-readable medium storing code for wireless communication, the code comprising instructions executable by a processor to perform the method of one or more of Aspects 20-38.

Aspect 48: A non-transitory computer-readable medium storing a set of instructions for wireless communication, the set of instructions comprising one or more instructions that, when executed by one or more processors of a device, cause the device to perform the method of one or more of Aspects 20-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving downlink control information (DCI) associated with a DCI format for shared channel scheduling on a set of cells, wherein the DCI is associated with a cell radio network temporary identifier (C-RNTI) and a configured scheduling radio network temporary identifier (CS-RNTI), and wherein the DCI format includes a carrier indicator field corresponding to the C-RNTI and the CS-RNTI; and
   decoding the DCI to identify a scheduling on the set of cells or to identify downlink feedback information (DFI) based at least in part on a determination of whether the C-RNTI or the CS-RNTI satisfies a cyclic redundancy check (CRC).

2. The method of claim 1, wherein the CS-RNTI satisfies the CRC, and
   wherein the DCI is configured for activation, release, or retransmission for a single cell in a downlink semi-persistent scheduling scenario or an uplink configured grant scenario.

3. The method of claim 2, wherein the single cell is based at least in part on a cell configured with downlink semi-persistent scheduling or configured with an uplink configured grant from the set of cells for which the DCI format for shared channel scheduling is associated.

4. The method of claim 2, wherein the single cell is based at least in part on a received indication of the single cell.

5. The method of claim 1, wherein the CS-RNTI satisfies the CRC, and
   wherein the DCI is configured for activation, release, or retransmission for one or more cells in a downlink semi-persistent scheduling scenario or an uplink configured grant scenario.

6. The method of claim 5, wherein the one or more cells is based at least in part on a subset of the set of cells for which the DCI format for shared channel scheduling is associated.

7. The method of claim 5, wherein the one or more cells includes at least one cell other than a group of cells monitored for receiving the DCI.

8. The method of claim 1, wherein the DCI includes a configured grant DFI for shared channel transmissions on a single cell.

9. The method of claim 8, wherein the single cell is based at least in part on a mapping of the carrier indicator field to a carrier.

10. The method of claim 1, wherein the DCI includes a configured grant DFI for shared channel transmissions on one or more cells.

11. The method of claim 10, wherein the one or more cells are based at least in part on a mapping of the carrier indicator field to one or more carriers.

12. The method of claim 10, wherein the DCI includes a hybrid automatic repeat request (HARQ) acknowledgment (ACK) bitmap for the one or more cells.

13. The method of claim 12, wherein a first set of HARQ process indices for a first cell, of the one or more cells, are mapped in a static order and concatenated to a second set of HARQ process indices for a second cell, of the one or more cells, to form the HARQ ACK bitmap.

14. The method of claim 12, wherein a first HARQ process index for the one or more cells forms a first sub-bitmap, of the HARQ ACK bitmap, which is concatenated to a second sub-bitmap corresponding to a second HARQ process index for the one or more cells to form the HARQ ACK bitmap.

15. The method of claim 1, wherein the DCI includes at least one transmit power control (TPC) command field for at least one uplink shared channel.

16. The method of claim 15, wherein the at least one TPC command field is a single TPC command field applicable to each serving cell for which hybrid automatic repeat request (HARQ) acknowledgment (ACK) information of the at least one uplink shared channel is included in the DCI.

17. The method of claim 15, wherein the at least one TPC command field is a set of TPC command fields applicable to a group of cells for which hybrid automatic repeat request (HARQ) acknowledgment (ACK) information of the at least one uplink shared channel is included in the DCI.

18. The method of claim 15, wherein the at least one TPC command field includes a first TPC command applicable to a single cell for which hybrid automatic repeat request (HARQ) acknowledgment (ACK) information is included in the DCI and a second TPC command applicable to a group of cells for which HARQ ACK information is included in the DCI.

19. The method of claim 1, wherein one or more trailing bits in the DCI are set to zero based at least in part on the DCI identifying the scheduling on the set of cells or identifying the DFI.

20. The method of claim 1, wherein the DCI is a single DCI.

21. A method of wireless communication performed by a network entity, comprising:
transmitting, to a user equipment (UE), downlink control information (DCI) associated with a DCI format for shared channel scheduling on a set of cells, wherein the DCI is associated with a cell radio network temporary identifier (C-RNTI) and a configured scheduling radio network temporary identifier (CS-RNTI), and wherein the DCI format includes a carrier indicator field corresponding to the C-RNTI and the CS-RNTI; and
communicating with the UE based at least in part on a scheduling on the set of cells or downlink feedback information (DFI) decoded from the DCI based at least in part on a whether the C-RNTI or the CS-RNTI satisfies a cyclic redundancy check (CRC).

22. The method of claim 21, wherein the CS-RNTI satisfies the CRC, and
wherein the DCI is configured for activation, release, or retransmission for a single cell in a downlink semi-persistent scheduling scenario or an uplink configured grant scenario.

23. The method of claim 22, wherein the single cell is based at least in part on a cell configured with downlink semi-persistent scheduling or configured with an uplink configured grant from the set of cells for which the DCI format for shared channel scheduling is associated.

24. The method of claim 22, wherein the single cell is based at least in part on a received indication of the single cell.

25. The method of claim 21, wherein the CS-RNTI satisfies the CRC, and
wherein the DCI is configured for activation, release, or retransmission for one or more cells in a downlink semi-persistent scheduling scenario or an uplink configured grant scenario.

26. The method of claim 25, wherein at least one of:
the one or more cells is based at least in part on a subset of one or more cells from the set of cells for which the DCI format for shared channel scheduling is associated, or
the one or more cells includes at least one cell other than a group of cells monitored for receiving the DCI.

27. A user equipment (UE) for wireless communication, comprising:
a memory; and
one or more processors, coupled to the memory, configured to:
receive downlink control information (DCI) associated with a DCI format for shared channel scheduling on a set of cells, wherein the DCI is associated with a cell radio network temporary identifier (C-RNTI) and a configured scheduling radio network temporary identifier (CS-RNTI), and wherein the DCI format includes a carrier indicator field corresponding to the C-RNTI and the CS-RNTI; and
decode the DCI to identify a scheduling on the set of cells or to identify downlink feedback information (DFI) based at least in part on a determination of whether the C-RNTI or the CS-RNTI satisfies a cyclic redundancy check (CRC).

28. The UE of claim 27, wherein the CS-RNTI satisfies the CRC, and
wherein the DCI is configured for activation, release, or retransmission for a single cell in a downlink semi-persistent scheduling scenario or an uplink configured grant scenario.

29. A network entity for wireless communication, comprising:
a memory; and
one or more processors, coupled to the memory, configured to:
transmit, to a user equipment (UE), downlink control information (DCI) associated with a DCI format for shared channel scheduling on a set of cells, wherein the DCI is associated with a cell radio network temporary identifier (C-RNTI) and a configured scheduling radio network temporary identifier (CS-RNTI), and wherein the DCI format includes a carrier indicator field corresponding to the C-RNTI and the CS-RNTI; and
communicate with the UE based at least in part on a scheduling on the set of cells or downlink feedback information (DFI) decoded from the DCI based at least in part on a whether the C-RNTI or the CS-RNTI satisfies a cyclic redundancy check (CRC).

30. The network entity of claim 29, wherein the CS-RNTI satisfies the CRC, and
wherein the DCI is configured for activation, release, or retransmission for a single cell in a downlink semi-persistent scheduling scenario or an uplink configured grant scenario.

* * * * *